(12) United States Patent
Sugata

(10) Patent No.: US 6,457,549 B1
(45) Date of Patent: Oct. 1, 2002

(54) NOISE-ABSORBING STRUCTURE FOR A CABLE REEL

(75) Inventor: Shouichi Sugata, Mie (JP)

(73) Assignee: Sumitomo Wiring Systems, Ltd., Yokkaich (JP)

( * ) Notice: Subject to any disclaimer, the term of this patent is extended or adjusted under 35 U.S.C. 154(b) by 72 days.

(21) Appl. No.: 09/584,199

(22) Filed: May 31, 2000

(30) Foreign Application Priority Data

May 31, 1999 (JP) .......................................... 11-152346

(51) Int. Cl.[7] .............................................. A47B 81/06
(52) U.S. Cl. ........................ 181/198; 181/200; 181/205
(58) Field of Search ................................ 181/198, 200, 181/205; 242/388, 388.1, 388.2

(56) References Cited

U.S. PATENT DOCUMENTS

| | | | |
|---|---|---|---|
| 5,137,463 A | 8/1992 | Sasaki et al. | |
| 5,637,005 A | 6/1997 | Bannai et al. | |
| 5,674,082 A | 10/1997 | Okuhara et al. | |
| 5,707,023 A | 1/1998 | Ichikawa et al. | |
| 5,975,453 A | * 11/1999 | Sakata et al. | ............... 242/388 |

FOREIGN PATENT DOCUMENTS

| | | |
|---|---|---|
| DE | 4419077 | 12/1994 |
| JP | 6-36040 | 9/1994 |
| JP | 10208837 | 8/1998 |

OTHER PUBLICATIONS

English Language Abstract of JP 10–208837.

* cited by examiner

Primary Examiner—Robert E. Nappi
Assistant Examiner—Kim Lockett
(74) Attorney, Agent, or Firm—Greenblum & Bernstein, P.L.C.

(57) ABSTRACT

A cable reel comprises a cable enclosure having a rubbing face, and a flat cable provided on the rubbing face. A noise-absorbing material is then fixed, without using adhesives, on the rubbing face on which the flat cable moves. The noise-absorbing material is prepared integrally by superposing a highly-slidable noise-absorbing sheet on a support plate, and is formed into a torus shape. The cable enclosure has an outer circular wall and an inner circular wall. The outer circular wall and/or the inner circular wall includes a plurality of holding tabs which are integrally provided in the circumferential direction with substantially a same distance and at a position corresponding to where the noise-absorbing material is mounted. The holding tabs hold the external circular rim and/or the internal circular rim of a highly-slidable noise-absorbing sheet, whereby the noise-absorbing material is immobilized.

22 Claims, 4 Drawing Sheets

FIG. 1 PRIOR ART
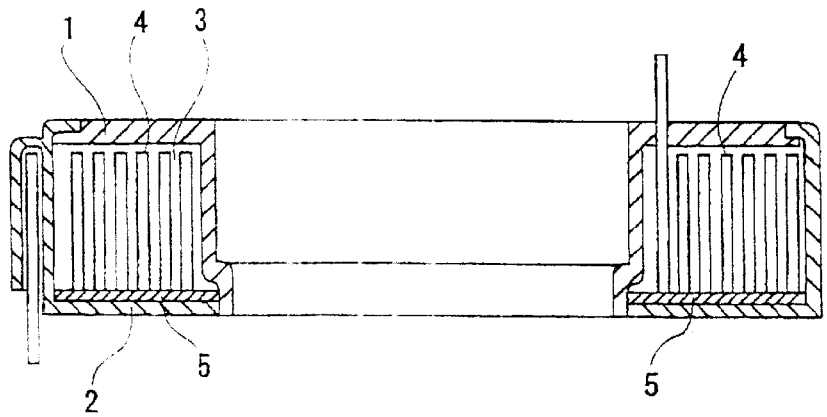
FIG. 2A PRIOR ART
FIG. 2B PRIOR ART
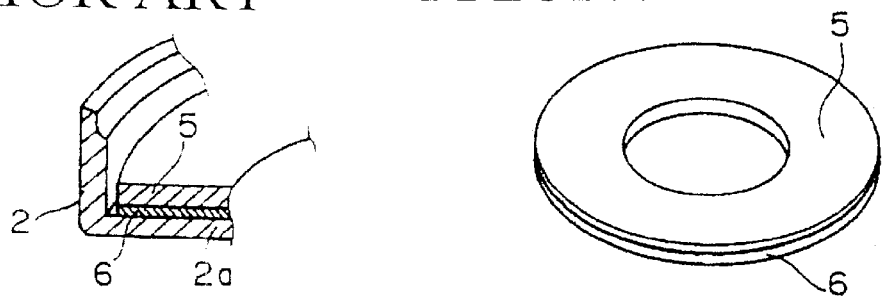
FIG. 3 PRIOR ART
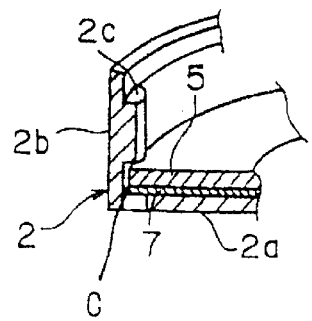

NOISE-ABSORBING STRUCTURE FOR A CABLE REEL

BACKGROUND OF THE INVENTION

1. Field of the Invention

The present invention relates to a noise-absorbing structure for a cable reel. A cable reel is used in steering equipment for automobiles or in similar equipment, and secures electrical connections between fixed elements and mobile elements through a flat cable. The flat cable is stored in a cable-storing enclosure in a spiraled condition. More particularly, the invention concerns an improvement in the assembly structures of a noise-absorbing material, with which a flat cable is put in contact via a spring force.

2. Description of Background Information

As shown in FIG. 1, this type of cable reel has a ring-shaped cable-reel enclosure 3, including a mobile element 1 which rotates with a steering wheel, and a fixed element 2 which is fixed around an axis linked to the car body. A flat cable 4 is contained in the cable-reel enclosure 3 in a spiraled condition. One end of the flat cable 4 is connected to a conductor element linked to the mobile element 1, while its other end is connected to a conductor element linked to the fixed element 2. In the above cable reel 4, when the steering wheel is rotated clockwise or counterclockwise, the flat cable is either wound or unwound. In this manner, equipment mounted on the steering wheel, e.g. an airbag, and electrical power sources on the side of the car body, are electrically connected.

In the above cable reel, when the flat cable 4 is wound or unwound, the side rims of the helical flat cable rub against the surfaces of cable reel enclosure 3 which are in contact with the corresponding side rim. This rubbing emits unpleasant noises. Further, the vibrations caused by idling or driving a car will make the flat cable 4 move to-and-fro along the axis of steering wheel. The flat cable will then bump against the rubbing surfaces, thereby further creating unpleasant noises.

In order to reduce unpleasant rubbing noises, Japanese Utility Model HEI 6-36040 disclosed a mechanism shown in FIGS. 2A and 2B, in which a noise-absorbing smooth sheet 5, e.g. a tetrafluoroethylene resin sheet, is adhered to a top rubbing surface and a bottom rubbing surface, respectively, or only to the bottom rubbing surface 2a, with an adhesive material 6. As an alternative to direct adhesive adhesion as described above, the noise-absorbing smooth sheet and the rubbing surfaces can be fixed mechanically, as shown in FIG. 3: the internal face of outer circular wall 2b of the fixed element 2 is provided with a protrusion 2c; the noise-absorbing smooth sheet 5 is then superposed on a supporting plate 7; and the entire structure is inserted between the bottom rubbing surface 2a and the protrusion 2c. Alternatively, as shown in FIG. 4 for a variant, a supporting plate 7' is provided with a hook portion 7a', whereas the bottom rubbing surface 2a is provided with a stopper hole 2d. The noise absorbing smooth sheet 5 is then superposed on, and adhered to, the variant supporting plate 7', and the entire structure is fixed to the bottom rubbing surface 2a by inserting the hook portion 7a' into the stopper hole 2d.

In the structures shown in FIGS. 3 and 4, a clearance C is formed between the noise-absorbing smooth sheet 5 and the supporting plate 7, and also between the internal face of outer circular wall 2b of the fixed element 2 and an inner circular wall (not shown in the Figures), respectively. Accordingly, vibrations caused by driving the car bias the noise-absorbing smooth sheet 5 and the supporting plate 7 diametrically, so that the supporting plate 7 comes into contact with the outer circular wall 2b and the inner circular wall, and generates unpleasant vibration noises. In particular, when the motor is idled, the unpleasant noises caused by vibration sound fairly loud. Besides, when there are clearances C on the external and internal circular rims of both the noise-absorbing smooth sheet 5 and supporting plate 7, the noiseabsorbing smooth sheet 5 rotates together with the flat cable which is in contact therewith. The noise-absorbing smooth sheet 5 then tends to jolt also in the circumferential direction of the rotation. Rubbing noises may thus be created.

If the supporting plate 7 is downsized with regard to the noise-absorbing smooth sheet 5, the latter will come into contact with the circular walls, before the support plate 7 will. The vibration noises caused by the support plate 7 may thus be reduced. However, when manufacturing the ring-shaped sheet, the noise-absorbing smooth sheet 5 and the supporting sheet 7 are integrally formed by stamping. Accordingly, it is difficult to downsize only the supporting plate 7 when manufacturing. If they are made separately and secured together, production will become costlier.

When the noise-absorbing smooth sheet 5 shown in FIG. 2B is directly adhered to the rubbing face with an adhesive material 6, the former does not move, thereby generating no vibration noise. However, the noise-absorbing smooth sheet 5 and the adhesive material 6 must then be preliminarily adhered and layered. Moreover, a process step of adhering the adhesive material 6 to the rubbing face must be added in the operation.

An object of the present invention is therefore to provide a cable reel in which the noise-absorbing smooth sheet is fixed to the rubbing face of the cable reel, without being adhered thereto directly. Further, the noise-absorbing smooth sheet and the supporting plate are formed integrally so that the process steps are reduced. This structure prevents the generation of contact noises, which would otherwise be created when the smooth sheet and the supporting plate abut against the circular walls and base wall.

SUMMARY OF THE INVENTION

To solve the above problem, there is provided a noise-absorbing structure for a cable reel, the cable reel including a cable enclosure having a ring shape with a diametrically larger inner circular face and a diametrically smaller inner circular face. The cable enclosure includes a noise-absorbing material formed of a noise-absorbing smooth sheet and a supporting plate, and the diametrically larger inner circular face is unitarily provided with at least two holding tabs arranged substantially at equal intervals in the circumferential direction, such that the holding tabs immobilize the noise-absorbing material by holding the noise-absorbing smooth sheet.

Suitably, the at least two holding tabs include three or four holding tabs. The diametrically smaller inner circular face may also be provided unitarily with at least two, suitably three or four, holding tabs arranged in the circumferential direction and spaced apart with substantially the same distance therebetween.

In the above structure, the cable enclosure may further include a fixed element, and a mobile element mounted thereon in a freely rotatable way, so as to form a ring-shaped enclosure at least including an outer circular wall, an inner circular wall and a base wall.

In a preferred embodiment, the ring-shaped enclosure with the base wall is provided with a notch having two opposing side faces which extend inwardly from the outer circular wall. The noise-absorbing material is then sized to the same shape as the base wall and is superposed thereon, and the two opposing side faces include holding tabs which immobilize the noise-absorbing material by holding the noise-absorbing smooth sheet.

Preferably still, the base wall of the fixed element is provided with rapping holes corresponding to the holding tabs, and the rapping holes serve as checking holes to check whether or not the noise-absorbing material is mounted in the cable enclosure.

There is also provided a cable reel including a noise-absorbing structure, the cable reel including a cable enclosure having a ring shape with a diametrically larger inner circular face and a diametrically smaller inner circular face, wherein the cable enclosure includes a noise-absorbing material formed of a noise-absorbing smooth sheet and a supporting plate, and the diametrically larger inner circular face is unitarily provided with at least two holding tabs arranged in the circumferential direction with substantially the same distance apart therebetween, such that the holding tabs immobilize the noise-absorbing material by holding the noise-absorbing smooth sheet. The cable enclosure further includes a flat cable disposed on the noise-absorbing material in a wound state. The flat cable has two ends in the length direction, one end thereof being fixed to a rotatable mobile element and the other end thereof being fixed to a fixed element, so that the flat cable is wound or unwound depending on the rotation of the mobile element.

There is further provided a steering wheel incorporating a noise-absorbing structure for cable reel, the cable reel including a cable enclosure having a ring shape with a diametrically larger inner circular face and a diametrically smaller inner circular face. The cable enclosure includes a noise-absorbing material formed of a noise-absorbing smooth sheet and a supporting plate, and the diametrically larger inner circular face is unitarily provided with at least two holding tabs arranged in the circumferential direction with substantially the same distance apart therebetween, such that the holding tabs immobilize the noise-absorbing material by holding the noise-absorbing smooth sheet.

In the above noise-absorbing structure, if only the bottom side rim of the flat cable is in contact with the rubbing bottom face, the holding tabs are formed on the outer circular wall and/or inner circular wall near the rubbing base wall. When, in addition, the upper side rim of the flat cable is in contact with the upper rubbing face, the holding tabs may be provided on the circular walls adjacent to the upper rubbing face.

For example, holding tabs may be provided on the outer circular wall of the fixed element. These holding tabs put into contact the internal circular rim of noise-absorbing smooth sheet with the inner circular wall, so that the sheet is immobilized. Alternatively, the holding tabs may be provided on the outer circular wall and the inner circular wall. The holding tabs then hold both the external circular rim of the noise-absorbing smooth element and the internal circular rim thereof.

The holding tabs are preferably in the form of a hemisphere. The contact surface between the holding tabs and the noise-absorbing smooth sheet is thus small, and the rubbing surface is also rendered small. Accordingly, wear on the noise-absorbing smooth sheet is reduced, and the durability thereof is enhanced.

Preferably, the noise-absorbing smooth sheet is made by coating highly smooth tetrafluoroethylene resin on an elastic and flexible sheet such as a rubber or resin sheet. Suitably, the noise-absorbing smooth sheet is incorporated with a support plate made of polyethyleneterephthalate or polyethylene in a mold, to form a torus- or ring-shaped product. The tip portion of the holding tabs is in contact with the outer circular rim and/or inner circular rim of the elastic and flexible noise-absorbing sheet, so that the holding tabs are firmly fitted.

Advantageously, the inventive noise-absorbing material can be fitted with the holding tabs while it is in contact therewith, without causing any creaking.

When the holding tabs are formed on the outer and/or inner circular walls substantially with a same pitch therebetween, not only the noise-absorbing smooth sheet, but also the support plate is immobilized in the diametrical direction by the holding tabs. When the automobile engine is run or idled, it causes vibrations, and creates noises when the support plate clatters against the circular walls. However, the inventive structure can prevent or reduce such vibration noises.

Moreover, the noise-absorbing material is also immobilized in the circumferential direction by the holding tabs. Usually, when the noise-absorbing material is moved in the circumferential direction, creaking is created by the rubbing face. However, this creaking is also prevented by virtue of the holding tabs of the invention.

Further yet, as no adhesive is used for fixing, the process of installing the noise-absorbing material is rendered easier, and productivity is enhanced.

The fixed element has a base wall and is provided with a notch extending inwardly from the outer circular rim so as to form a U-shape having two opposing side faces on the bottom face. Part of the outer circular portion of noise-absorbing material is then sized up in the same shape as the bottom face and superposed thereon. In this case, the two opposing side faces may include holding tabs. The holding tabs then hold the rim faces of the noise-absorbing smooth sheet forming the noise-absorbing material.

The holding tabs are provided on the outer and/or inner circular walls. Correspondingly, rapping holes for the holding tabs are formed in the base wall of the fixed element. These holes are then used for checking whether or not the noise-absorbing material is mounted in the cable reel. In other words, as the outer circular wall and the inner circular wall are integrally provided with the base wall, the rapping holes are perforated in the base wall, in order to form the holding tabs. By virtue of this configuration, the noise-absorbing material can be seen from outside, also through these rapping holes. In this manner, the presence of noise-absorbing smooth sheet can be checked after the cable reel has been mounted.

BRIEF DESCRIPTION OF THE DRAWINGS

The above and the other objects, features, and advantages of the present invention will be made apparent from the following description of the preferred embodiments, given as non-limiting examples, with reference to the accompanying drawings, in which:

FIG. 1 is a cross-sectional side view of a prior art cable reel;

FIG. 2A is a partial perspective view of a prior art cable reel showing how a known noise absorbing material is mounted;

FIG. 2B is a perspective view of the noise-absorbing material of FIG. 2A;

FIG. 3 is a partial perspective view of another prior art cable reel showing how a known noise-absorbing material is mounted;

DETAILED DESCRIPTION OF THE PREFERRED EMBODIMENTS

Figure 4:
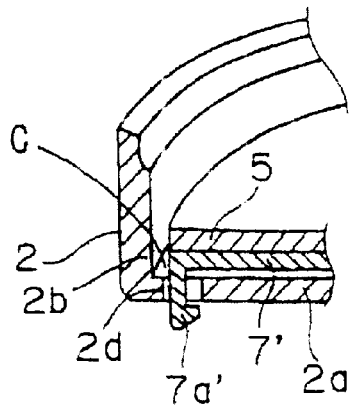
FIG. 4 is a partial perspective view of yet another prior art cable reel showing how a known noise-absorbing material is mounted.
Figure 5:
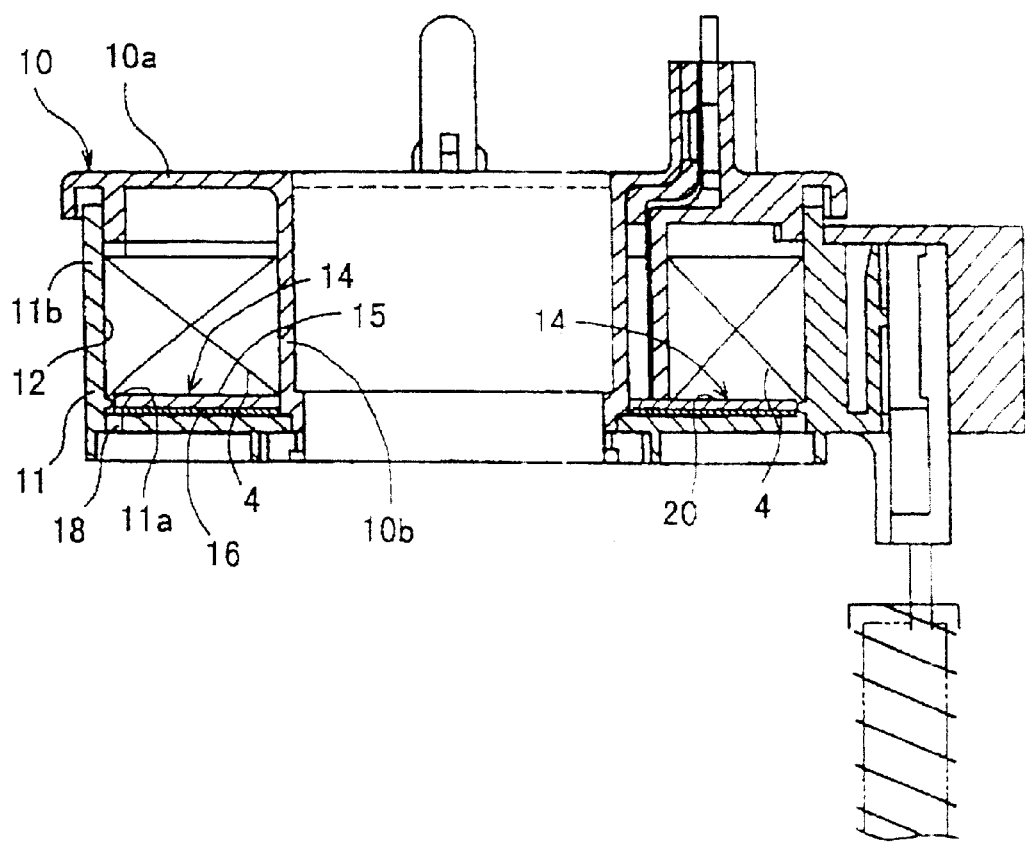
FIG. 5 is a cross-sectional side view of the cable reel according to a first embodiment of the invention.

FIGS. 5 to 8 show a first embodiment of the invention, in which the noise-absorbing structure for cable reel is applied to the steering wheel of an automobile. The structure of cable reel is the same as the one shown in FIG. 1. The same features are therefore indicated with the same reference numerals in the respective figures.

A mobile element 10 rotates in unison with a steering wheel, whereas a fixed element 11 is linked to a fixed axis of a car body. The mobile element 10 and the fixed element 11 form a cable enclosure 12 in the shape of a torus or ring. In the cable enclosure 12 is stored a flat cable 4 in a helically wound condition. One end of the flat cable 4 is bound to a first electrical conductor fixed to the mobile element 10, whereas the other end thereof is bound to a second electrical conductor fixed to the fixed element 11. The flat cable 4 is wound or unwound, corresponding either to a clockwise or a counter-clockwise rotation of the steering wheel. Apparatuses, e.g. an air bag, located at the steering wheel side and the electrical power source located at the car body side are thus electrically connected.

In the cable enclosure 12, the mobile element 10 forms a top wall 10a and an inner circular wall 10b, whereas the fixed element 11 forms a base wall 11a and an outer circular wall 11b. The internal face of base wall 11a forms a rubbing face 13, against which rubs the bottom side rim of flat cable 4. The fixed element 11 is further provided with an inner circular protrusion 11c. This protrusion 11c is relatively small and may be located at a position roughly corresponding to that of internal circular wall 10b. The noise-absorbing material 14 is fittingly mounted (without adhesive) on the bottom rubbing face 13, in the part of the ring between the outer circular wall 11b of fixed element 11 and the inner circular protrusion 11c thereof.

Figure 6A:
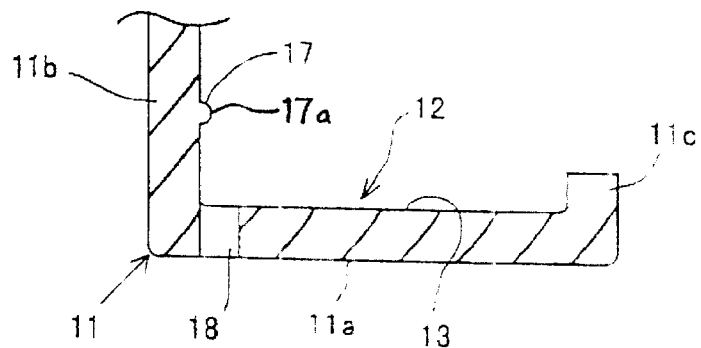
FIG. 6A is a schematic cross-sectional view of the main portion of the fixed element according to the invention.
Figure 6B:
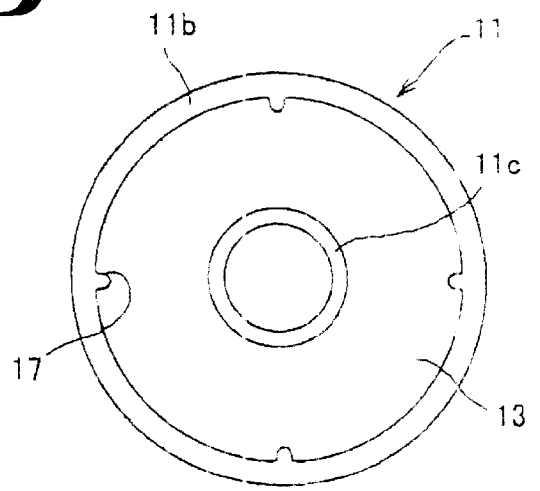
FIG. 6B is a schematic top plan view of the fixed element of FIG. 6A.

As shown in FIGS. 6A and 6B, the fixed element 11 forms the outer circular wall 11b of cable enclosure 12. The internal circular face of outer circular wall 11b is provided with four holding tabs 17, which are spaced a predetermined distance above the rubbing bottom face 13, for example, about 1 mm above the rubbing bottom face 13, and arranged at spaced positions about the circumference of the outer wall 11b, for example, at a pitch of about 90° along the circumferential direction of the ring. It is important that the holding tabs 17 be positioned at a location above the rubbing bottom face 13 that coincides with the location of the noise-absorbing smooth sheet 15 for engagement with the side edge thereof. The holding tabs 17 may be provided on the outer circular wall 11b in any suitable manner, for example, by mechanical or adhesive attachment, or may be formed unitarily and in one-piece with the outer circular wall 11b, for example, by molding.

When the fixed element 11 is formed, rapping holes are provided in the base wall 11a. These rapping holes are used as checking holes 18 for checking the presence of noise-absorbing smooth sheet 15. The checking holes 18 are thus located at positions extending along the outer circle of the base wall 11a, and just under the corresponding holding tabs 17.

Figure 7:
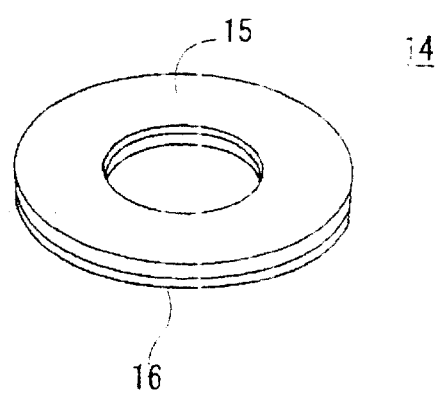
FIG. 7 is a perspective view of a noise-absorbing material of the invention.

As shown in FIG. 7, the noise-absorbing material 14 is formed by incorporating a noise-absorbing smooth sheet 15 and a supporting or reinforcing plate 16. The support plate 16 is made of any suitable material, for example, polyethyleneterephthalate (PET) or polyethylene, having a thickness of about 0.5 mm. The high-slidable noise-absorbing sheet 15 is made of a highly slidable tetrafluoroethylene sheet having a thickness of about 1.0 mm to about 1.5 mm. In the figure, the noise-absorbing smooth sheet 15 is adhered to the upper face of the supporting plate 6. The noise-absorbing material 14 is then stamped out in a circular form substantially the same as that of the base wall 11a of fixed element 11. The noise-absorbing material 14 is designed to snugly fit between the outer circular wall 11b and the inner circular protrusion 11c.

Figure 8:
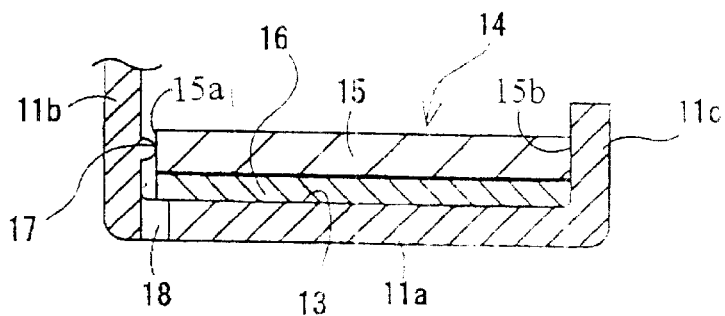
FIG. 8 is a cross-sectional view of the inventive noise-absorbing structure showing how the noise-absorbing material is mounted in the fixed element.

The incorporated supporting plate 16 and noise-absorbing smooth sheet 15 is thus mounted on the base wall 11a of fixed element 11, and fitted between the outer circular wall 11b and the inner circular protrusion 11c. When mounting the noise-absorbing material 14, its external circular rim is pushed between the tips 17a of the holding tabs 17. As shown in FIG. 8, the inner circular rim 15b of noise-absorbing smooth sheet 15 is then pressed against the inner circular protrusion 11c. Consequently, the supporting plate 16 and the noise-absorbing smooth sheet 15 are firmly fixed, not only against the bottom rubbing face of the base wall 11a, but also between the outer circular wall 11b and the inner circular protrusion 11c, so that they are immobilized both in the circumferential and diametrical directions.

The noise-absorbing smooth sheet 15 is made of a soft and elastic material. The tips 17a of holding tabs 17 are in contact with the outer circular rim 15a of noise-absorbing smooth sheet 15. As the latter is firmly fitted with the holding tabs 17, no creaking nor vibration occurs between them.

As the noise-absorbing material 14 is fixed on the rubbing bottom face 11a mentioned above, the former 14 can no longer be biased by car vibrations in the diametrical direction. Accordingly, vibration noises, caused by the contact between the supporting plate 16 and the circular walls, are prevented or reduced. Further, while the flat cable 4 is rotated, the noise-absorbing material 14 is prevented from being entrained by this rotation. The creaking between the noise-absorbing material 14 and the rubbing bottom face 13 is thus avoided.

Further, the noise-absorbing smooth sheet 15 is fixed on the rubbing bottom face 13 without using any adhesive. Accordingly, installation of the noise-absorbing smooth sheet 15 is easier. Furthermore, the installation of the noise-absorbing material 14 can be easily and surely inspected through the four checking holes 18 provided in the base wall 11a of fixed element 11.

In the present embodiment, the upper face of cable enclosure 12 is provided with fine ribs 18 in the diametrical direction at a given pitch in the circumferential direction. Further, there is provided a slight clearance between the ribs 18 and the upper side rim of flat cable 4. There is thus little rubbing noise generated on the upper face, where there is no noise-absorbing material, or corresponding holding tabs. Alternatively, instead of providing the ribs 18, the upper face may be made flat. If th flat cable may rub against the upper face, as seen for the bottom face, there may be installed a noise-absorbing material on the upper face too. There may then be provided, near the upper face, holding tabs for that noise-absorbing material.

Figure 9:
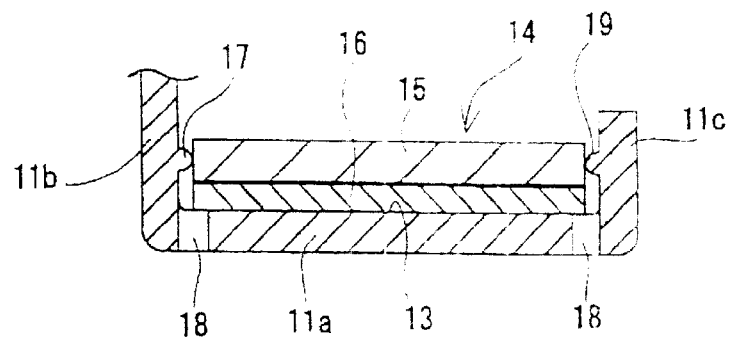
FIG. 9 is a cross-sectional view of the inventive noise-absorbing structure according to a second embodiment.

FIG. 9 shows a second embodiment, in which the inner circular protrusion 11c projecting from the inner circle of fixed element 11 is also provided with holding tabs 19 having a hemispheric form. Accordingly, both the outer circular wall 11b and the inner circular protrusion 11c are provided with the tabs 17 and 19. These tabs press-hold the external circular face 15a of noise-absorbing material 14 and the internal circular face thereof, so that the noise-absorbing material 14 is immobilized.

In the first and second embodiments, the holding tabs are arranged at a pitch of 90°. Instead, three holding tabs may be provided at a pitch of around 120°. The shape of the holding tabs 17 and 19 is not limited to the hemispheric form. It suffices to have a tip shape 17 or 19 adapted to be put into contact with the noise-absorbing smooth sheet 15.

Figure 10:
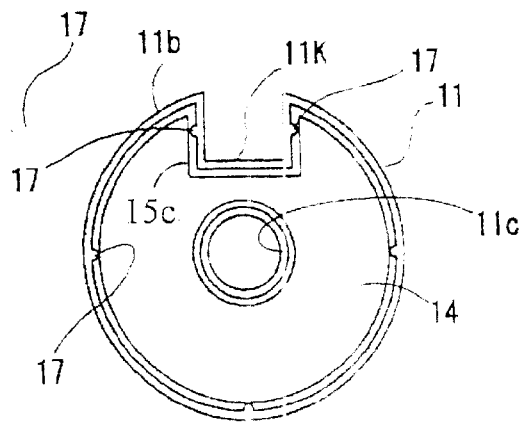
FIG. 10 is a top plan view of the inventive noise-absorbing structure according to a third embodiment.

FIG. 10 shows a third embodiment, in which the base wall 11a of fixed element 11 includes a U-shaped notch 11k, formed from part of the external circular of fixed element 11. The noise-absorbing material is then provided with a corresponding notch 15c from part of its outer circular. Subsequently, the noise-absorbing material 14 is mounted on the fixed element 11, so that the notched outer circular rim of the former engages with the notched outer circular wall of the latter.

In this case, opposing sides of the U-shaped notch 11k formed in the outer circular wall 11b are provided with holding tabs 17, and these tabs 17 are abutted against the external circular rim of noise-absorbing smooth sheet 15 which forms the noise-absorbing material 14.

As described above, a noise-absorbing materal is made by incorporating a noise-absorbing smooth sheet and a supporting plate. This noise-absorbing material is disposed on a rubbing face without using adhesive and is fixed by the holding tabs provided on the circular wall in the diametrical direction. The diametrical fixture also prevents biasing in the circumferential direction, so that vibration noises caused by the contact between the supporting plate and the circular walls, as well as the rubbing noises are suppressed.

Further, the holes provided to form holding tabs can be used as checking holes for checking whether or not the noise-absorbing material is mounted in the cable reel.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. HEI 11-152346, filed on May 31, 1999, which is herein expressly incorporated by reference in its entirety.

What is claimed:

1. A noise-absorbing structure for a cable reel, the cable reel including a cable enclosure having a ring-shape with a diametrically larger inner circular face and a diametrically smaller inner circular face, wherein said cable enclosure includes a noise-absorbing material comprised of a noise-absorbing smooth sheet and a supporting plate, and said diametrically larger inner circular face is provided with at least two holding tabs which are arranged at intervals in the circumferential direction, such that said holding tabs immobilize said noise-absorbing material by engaging and holding said noise-absorbing smooth sheet.

2. The noise-absorbing structure for a cable reel according to claim 1, wherein said at least two holding tabs include three holding tabs.

3. The noise-absorbing structure for a cable reel according to claim 1, wherein said at least two holding tabs include four holding tabs.

4. The noise-absorbing structure for a cable reel according to claim 1, wherein said diametrically smaller inner circular face is also provided with at least two holding tabs arranged in the circumferential direction with substantially the same distance apart therebetween.

5. The noise-absorbing structure for a cable reel according to claim 1, wherein said cable enclosure further includes a fixed element, and a mobile element mounted thereon in a freely rotatable way, so as to form a ring-shaped enclosure at least comprising an outer circular wall, an inner circular wall and a base wall.

6. The noise-absorbing structure for a cable reel according to claim 2, wherein said cable enclosure further includes a fixed element, and a mobile element mounted thereon in a freely rotatable way, so as to form a ring-shaped enclosure at least comprising an outer circular wall, an inner circular wall and a base wall.

7. The noise-absorbing structure for a cable reel according to claim 3, wherein said cable enclosure further includes a fixed element, and a mobile element mounted thereon in a freely rotatable way, so as to form a ring-shaped enclosure at least comprising an outer circular wall, an inner circular wall and a base wall.

8. The noise-absorbing structure for a cable reel according to claim 4, wherein said cable enclosure further includes a fixed element, and a mobile element mounted thereon in a freely rotatable way, so as to form a ring-shaped enclosure at least comprising an outer circular wall, an inner circular wall and a base wall.

9. The noise-absorbing structure for a cable reel according to claim 5, wherein said ring-shaped enclosure with said base wall is provided with a notch having two opposing side faces which extend from said outer circular wall inwardly, wherein said noise-absorbing material is sized to the same shape as said base wall and superposed thereon, and wherein said two opposing side faces comprise holding tabs which immobilize said noise-absorbing material by holding said noise-absorbing smooth sheet.

10. The noise-absorbing structure for a cable reel according to claim 6, wherein said ring-shaped enclosure with said base wall is provided with a notch having two opposing side faces which extend from said outer circular wall inwardly, wherein said noise-absorbing material is sized to the same shape as said base wall and superposed thereon, and wherein said two opposing side faces comprise holding tabs which immobilize said noise-absorbing material by holding said noise-absorbing smooth sheet.

11. The noise-absorbing structure for a cable reel according to claim 7, wherein said ring-shaped enclosure with said base wall is provided with a notch having two opposing side faces which extend from said outer circular wall inwards, wherein said noise-absorbing material is sized to the same shape as said base wall and superposed thereon, and wherein said two opposing side faces comprise holding tabs which immobilize said noise-absorbing material by holding said noise-absorbing smooth sheet.

12. The noise-absorbing structure for a cable reel according to claim 8, wherein said ring-shaped enclosure with said base wall is provided with a notch having two opposing side faces which extend from said outer circular wall inwards, wherein said noise-absorbing material is sized to the same shape as said base wall and superposed thereon, and wherein said two opposing side faces comprise holding tabs which immobilize said noise-absorbing material by holding said noise-absorbing smooth sheet.

13. The noise-absorbing structure for a cable reel according to claim 5, wherein said base wall of said fixed element is provided with rapping holes corresponding to said holding tabs, and said rapping holes serve as checking holes to check whether or not said noise-absorbing material is mounted in said cable enclosure.

14. The noise-absorbing structure for a cable reel according to claim 6, wherein said base wall of said fixed element is provided with rapping holes corresponding to said holding tabs, and said rapping holes serve as checking holes to check whether or not said noise-absorbing material is mounted in said cable enclosure.

15. The noise-absorbing structure for a cable reel according to claim 7, wherein said base wall of said fixed element is provided with rapping holes corresponding to said holding tabs, and said rapping holes serve as checking holes to check whether or not said noise-absorbing material is mounted in said cable enclosure.

16. The noise-absorbing structure for a cable reel according to claim 8, wherein said base wall of said fixed element is provided with rapping holes corresponding to said holding tabs, and said rapping holes serve as checking holes to check whether or not said noise-absorbing material is mounted in said cable enclosure.

17. A cable reel comprising a noise-absorbing structure, said cable reel including a cable enclosure having a ring-shape with a diametrically larger inner circular face and a diametrically small inner circular face, wherein said cable enclosure includes a noise-absorbing material comprised of a noise-absorbing smooth sheet and a supporting plate, and said diametrically larger inner circular face is provided with at least two holding tabs arranged in the circumferential direction with substantially the same distance apart therebetween, such that said holding tabs immobilize said noise-absorbing material by holding said noise-absorbing smooth sheet, wherein said cable enclosure further includes a flat cable disposed on said noise-absorbing material in a wound condition, and wherein said flat cable has two ends in the length direction, one end thereof being fixed to a rotatable mobile element and the other end thereof being fixed to a fixed element, so that said flat cable is wound or unwound depending on the rotation of said mobile element.

18. A steering wheel incorporating a noise-absorbing structure for a cable reel, the cable reel including a cable enclosure having a ring-shape with a diametrically larger inner circular face and a diametrically smaller inner circular face, wherein said cable enclosure includes a noise-absorbing material comprised of a noise-absorbing smooth sheet and a supporting plate, and said diametrically larger inner circular face is provided with at least two holding tabs arranged in the circumferential direction with distances therebetween, such that said holding tabs immobilize said noise-absorbing material by engaging and holding said noise-absorbing smooth sheet.

19. The noise-absorbing structure for a cable reel according to claim 1, wherein said at least two holding tabs are formed unitarily and in one piece with said diametrically larger inner circular face.

20. The cable reel according to claim 17, wherein said at least two holding tabs are formed unitarily and in one piece with said diametrically larger inner circular face.

21. The noise-absorbing structure for a cable reel according to claim 1, wherein said intervals are equal intervals.

22. The steering wheel incorporating a noise-absorbing structure for a cable reel according to claim 18, wherein said distances are equal distances.

* * * * *